June 15, 1948.    P. C. GALLAGHER    2,443,236
SHOPPING PERAMBULATOR
Filed Feb. 24, 1947
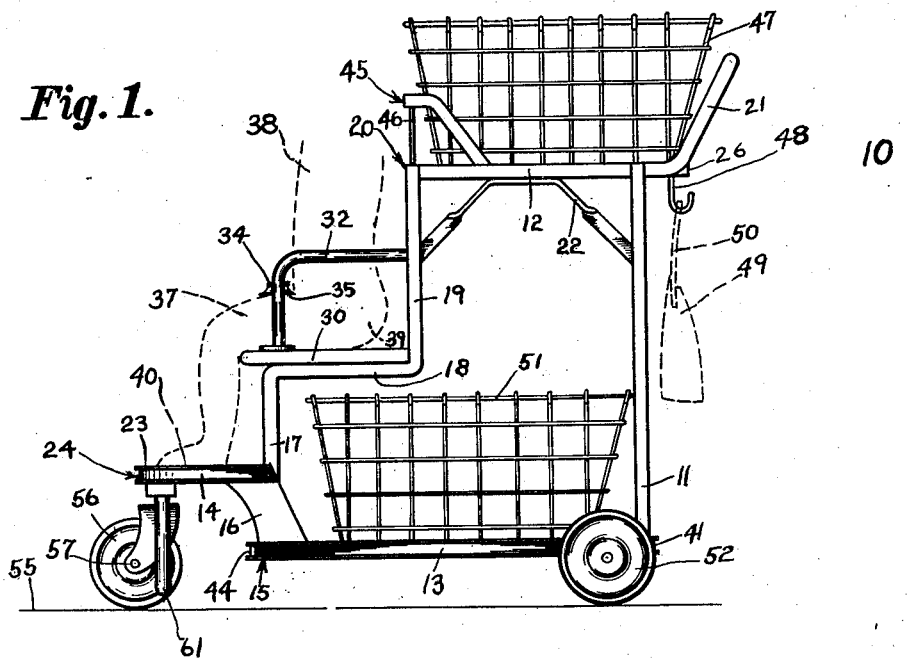
INVENTOR.
P. C. Gallagher
By Arthur H. Sturges
Attorney.

Patented June 15, 1948

2,443,236

UNITED STATES PATENT OFFICE 2,443,236

SHOPPING PERAMBULATOR

Paul C. Gallagher, Omaha, Nebr.

Application February 24, 1947, Serial No. 730,296

1 Claim. (Cl. 280—50)

The present invention relates to vehicles and more particularly, to perambulators.

It is an object of the invention to provide a perambulator which is so constructed that an adult, while shopping a grocery store, may gather groceries from various parts of said store and transport the merchandise on the new device to a cashier or clerk for purchase while, at the same time, an infant or child, accompanying said adult, may be transported on the vehicle during said shopping in a manner whereby the infant is guarded in a comfortable position, prevented from mischief and without interfering with said shopping nor the transaction of business in said store.

A further object of the invention is to provide a device for the above stated purposes which is of but little greater transverse width than the width of an infant, whereby the new device may be readily wheeled about a crowded store upon the floor of the latter and without colliding with stacks of merchandise or other occupants of the store and which includes a means for securing an infant thereto in a manner whereby said infant is prevented from handling the merchandise sold by said store, during purchase of the merchandise by the infant's mother, nurse, or the like.

A further object of the invention is to provide a vehicle having a single caster wheel at the front end thereof, said wheel being disposed medially of the transverse width of said vehicle, whereby the wheel may swivel about during use without contacting stacks of merchandise during a guiding of the vehicle about and upon the floor of a grocery store.

Another object of the invention is to provide a guard-horn at each side of the caster wheel of said vehicle for preventing the vehicle from tilting transversely unduly whereby the said infant and also a quantity of merchandise carried by the vehicle is prevented from becoming spilled or damaged.

A still further object of the invention is to provide a vehicle which is so constructed that one or more baskets, employed for containing groceries, may be transported simultaneously with an infant and in a manner whereby a basket is disposed partially under the seat of the vehicle for conserving room and a further basket is carried on the top of the new device.

Another object of the invention is to provide a vehicle for the above stated purposes having a hook in an accessible position at an upper rear end of the new device whereby a mother, during transportation of an infant on said device while simultaneously selecting and picking up merchandise, may suspend her purse from said hook in a convenient position for use and for freeing at least one of her hands for gathering merchandise into or upon the vehicle.

Other and further objects and advantages of the invention will be understood from the following detailed description thereof.

It is well known that at times when a housewife and her young child enters what is known as a "self-serve" chain store or the like where groceries are sold at retail, that the mother of the child in addition to pushing a wheeled vehicle about the store for the purpose of gathering merchandise on the vehicle must watch and attend to the said child thereby increasing the difficulties of transacting business both for the mother and the counter clerks of the store. It is also well known that at times when young children are permitted to roam about in a store that quantities of merchandise become misplaced resultant from the child handling the merchandise and that it often happens that children knock down stacks of packaged goods under the said conditions and the present invention aims to obviate certain of the undesirable features of the prior practice by providing a perambulator combination co-operative for transporting a child and merchandise thereon and in a manner whereby the child is restrained during the transportation and comfortably seated on the new device and the gathering of merchandise on the latter is facilitated.

In the drawing:

Figure 1 is a side view of a perambulator and depicting a preferred embodiment of the invention.

Figure 2 is a vertical elevation of the front end of the new device.

Figure 3 is a top plan view of the perambulator shown in Figures 1 and 2, certain portions thereof, including a basket guard being omitted for convenience of illustration.

Referring now to the drawing for a more particular description 10 indicates generally the perambulator of the present invention having two like spaced apart sides.

Each side preferably includes a standard 11, which, in use, is disposed approximately vertically having its upper and lower ends respectively welded or otherwise suitably secured to a shelf rail 12 and a bottom rail 13.

That side of the device shown in Figure 1 further includes a platform rail 14 which is disposed above the bottom rail 13 and a portion of the rail 14 extends forwardly beyond the forward end 15 of the bottom rail 13. The said forward end 15 and the rear end of the platform rail 14 are respectively welded to a side brace member 16.

The side of the new device, as shown in Figure 1, includes a vertically disposed bar 17 having its lower end suitably secured to the platform rail 14. The bar 17 is provided with a horizontally disposed portion 18 formed at a right angle with respect to the vertical portion 17 and a further portion 19 which extends from the rear end of the portion 18 vertically and in parallelism with the main body portion of the bar 17.

The upper end 20 of the bar portion 19 is welded to the forward end of the horizontally disposed shelf rail 12 and as thus described it will be seen that the side of the device, shown in Figure 1, is step-cut to provide three steps, the treads of the latter consisting of the platform rail 14, the said portion 18 of the bar 17 and the shelf rail 12. The risers of said steps consist of the bar 17 and the portion 19 of the bar 17.

The shelf rail 12 includes a rearwardly extending and upwardly disposed steering handle support portion 21.

A brace 22 is preferably employed having its ends respectively welded to the standard 11 and the portion 19 of the bar 17. A medial portion of the brace 22 is welded to the lower edge of the shelf rail 12, said brace having a contour preferably as shown in Figure 1 and being formed of strap iron or the like.

The above described parts 11 through 21 are preferably formed of angle iron or channel iron.

It will be understood that the side of the new device which is oppositely disposed with respect to the side shown in Figure 1 is similarly constructed whereby it is provided with three steps. The steps of the one side are disposed in horizontal alignment with the steps of the other side together with the rails and vertically disposed standards 11 and 11' of said sides.

As shown in Figure 2 the said oppositely disposed side of the new device includes a side brace member 16', a standard 11', a platform rail 14', a vertically disposed bar 17' and a portion 19' of the latter.

Across the lowermost steps of the sides a platform 23 is provided which is welded to the upper edges of the lowermost steps. The medial portion of the platform 23 is supported by a transversely disposed bar 24 having its opposite ends respectively welded to the platform rails 14 and 14'. If desired the bar 24 and the said platform rails 14 and 14' may be formed integral by bending a single piece of angle iron to a configuration which is approximately C-shaped in plan.

Across the forward and rear ends of the shelf rail's 12 and 12' shelf bars 25 and 26 are respectively secured thereto, as best shown in Figure 3.

The upper shelf further includes any desired number of longitudinally disposed bars 27 and preferably at least one transversely disposed bar 28. The ends of the bars 27 are respectively welded to the bars 25 and 26 and the ends of the bar 28 are respectively welded to the shelf rails 12 and 12' for providing a rigid construction and for supporting upon the said shelf a later described basket or container.

The steering handle of the device is indicated at 29 having its opposite ends respectively welded to the portion or extension 21 of the shelf rail 12 and to the extension or portion 21' of the shelf rail 12'.

Across those steps of the said sides which are intermediate with respect to the platform steps and the upper shelf steps of the said sides, a seat 30 is secured by any suitable means to the said intermediate steps and to the upper edges of the portions 18 and 18' of the oppositely disposed like bars 17 and 17' respectively.

A back for the seat is indicated at 31, said back preferably being formed of foraminous sheet metal. The edges of the back are respectively welded to the adjacent portion of the frame whereby the back of an infant or child may be supported and ventilated, together with providing a construction of light weight.

Adjacent each end of the seat 30 arm rests are provided for limiting movements of an infant seated on the member 30 transversely of the device.

Preferably the arms 32 and 33 are each formed of a length of pipe having a horizontally disposed portion and a vertically disposed portion. The ends of the pipe 32 are respectively secured to the seat and to the back 31, as shown in Figure 2, the said arm 33 being of the same construction and similarly secured to the new perambulator.

The vertically disposed portions of the arms 32 and 33 are each provided with a ring 34. The rings are disposed through or otherwise suitably attached to the arms 32 and 33 respectively.

A detent strap 35 is employed having one of its ends secured to the ring 34 of the arm 33 as shown in Figures 2 and 3. The other end of the strap extends through the ring 34 of the arm 32 being provided with a buckle 36 for facilitating a detachment at the free end of the strap from the arm 32. As shown in Figure 2 the detent strap 35 is disposed a sufficient distance above the seat 30 so that the thighs 37 of the torso 38 of an infant or young child may be placed under the strap and between the latter and the seat 30 at the time the buttocks 39 of the said infant are disposed upon the seat 30 as shown by dotted lines in Figure 1.

The feet 40 of the infant are carried upon the platform 23 whereby the infant is comfortably positioned and is prevented from sliding off the seat 30 while a removal of the infant is permitted, since the nurse or mother of the infant may remove the detent 35 by manipulation of the buckle 36 or may grasp the shoulders of the infant for raising the latter upwardly with respect to the seat 30 and away from the new device at desired times.

The device further includes a bottom or lower shelf as best shown in Figure 2.

The lower shelf includes the bottom rail 13 which is oppositely disposed with respect to the like rail 13', a transversely disposed bar 41 having its opposite ends respectively welded to the rear ends of the rails 13 and 13' together with longitudinally disposed bars 42 and preferably at least one transverse bar 43.

The bar 43 has its opposite ends respectively welded to the bottom rail 13 and the latter's oppositely disposed mate 13'. The bars 42 have their rear ends welded to the bar 41 and their forward ends to a transversely disposed bar 44.

The bar 44 has its opposite ends respectively welded to the forward ends of the bottom rails 13 and 13' and since all of the above described bars are welded together a sturdy frame is provided.

The new device further includes a basket guard rail 45 which as best shown in Figures 1 and 2 is disposed above the upper end of the back 31 of the seat. The rail 45 extends rearwardly and downwardly having its ends respectively welded to the shelf rails 12 and 12'. As best shown in Figure 2 the medial portions of the guard rail 45 are provided with supports 46. The latter have their upper and lower ends respectively welded to the rail 45 and to the rail 25. The guard rail 45 and its supports 36 are omitted from Figure 3 for convenience of illustration.

Between the guard rail 45 and the handle 29 a basket 47 is disposed on the upper shelf during use of the new device.

To a lower medial portion of the transversely disposed upper shelf bar 26 a hook 48 is secured whereby a purse 49 may be suspended therefrom by means of its strap 50 in an accessible position and out of the reach of a child seated forwardly thereof.

The lower shelf is adapted to support thereon a second basket 51 which is of a lesser width than the distance between the standards 11 and 11' whereby the basket 51 may be withdrawn from the shelf and from between the said standards.

The forward end of the basket is disposed under the seat 30 co-operatively as shown in Figure 1 and since the handle 29 is disposed rearwardly of the frame a person may manipulate the handle for pushing the device forwardly conveniently while taking steps for pushing the new device about and upon the floor of a store, without said person's legs striking the rear end of the basket 51 or said frame.

The rear end of the frame is supported upon oppositely disposed like wheels 52 which, if desired, may be provided with rubber tires, said tires being preferred as shown.

The wheels 52 may be provided with stub axles or preferably an axle shaft 54 extends through the wheels, as shown in Figure 3, said axle shaft being welded to the under side of the bottom frame rails 13 and 13'.

The forward end of the vehicle is supported upon the floor 55 by means of a caster wheel 56.

The caster wheel 56 carries its axle 57 and the letter is disposed between the bifurcation of a fork 58.

The bridge of the fork is provided with a pivot pin 59. The latter is disposed through a flat iron bar 60 and secured to the transverse bar 24 whereby the caster wheel is permitted to have swiveling movements.

The bar 60 is spaced away from the rail 24 as best shown in Figure 2. The upturned ends of the bar 60 are welded to the lower side of the rail 24 and to the platform rails 14 and 14' respectively.

The caster wheel 56 is medially disposed with respect to the transverse width of the platform 23 whereby during a stearing of the vehicle upon the floor 55 the caster wheel, during its swiveling movements, does not contact with or knock down stacked merchandise. It has been found that in actual practice, that a single medially disposed caster wheel has many advantages over two caster wheels respectively secured under the forward corners of the platform 23.

As shown in Figure 1 a space under the platform and forward of the forward end of the rails 13 and 13' is co-operatively provided by means of the particular construction of the new device in which the caster wheel may define swivel movement during use.

It is desirable that, as shown, the transverse width of the perambulator be but slightly greater than the transverse width of a child seated thereon whereby the new device may be readily steered along tortuous passageways or aisles of a "self-serve" grocery store readily and since the device is comparatively narrow means are provided for preventing the perambulator from upsetting or tilting in directions transversely thereof such as would be possible should a grown person accidentally place his weight on one of the sides of the platform 23. Also obviously, in the event that a child secured on the seat of the new device should lean away from the said seat and over the sides of the perambulator unduly the perambulator could be upset. The said means includes a pair of oppositely disposed pins 61.

The pins are vertically disposed, the upper ends thereof being welded to the under side of the bar 60. The lower portions of the pins 61 are each provided with a terminal end which is semi-globular in contour and as shown in Figure 2 said ends are both disposed a sufficient distance above the floor 55 so that they do not contact with said floor at times when the vehicle is wheeled about and upon the floor.

However, said terminal ends are disposed close enough to the adjacent surface of the floor 55 so that they will co-operate to prevent a movement transversely in either direction of the perambulator whereby a child does not become spilled out of the seat 30 nor fragile merchandise such as eggs become spilled out of the baskets and the value thereof decreased.

From the foregoing description, it is thought to be obvious that a perambulator constructed in accordance with my invention is particularly well adapted for use by reason of the convenience and facility with which it may be assembled and operated, and it will also be obvious that my invention is susceptible of some change and modification including variations in the shape and size of the parts without departing from the principles and spirit thereof and for this reason, I do not wish to be understood as limiting myself to the precise arrangement and formation of the several parts herein shown in carrying out my invention in practice, except as claimed.

What I claim and desire to secure Letters Patent is:

A device for the purposes described comprising two like spaced apart sides adapted to be disposed vertically having front and rear ends, said sides each being step-cut to provide three steps; a platform disposed across the lowermost steps; an upper shelf disposed across the uppermost steps; a seat disposed across the intermediate steps; a lower shelf disposed across the bottoms of said sides; said platform being disposed above and extending forwardly beyond said lower shelf, all of the said parts being secured together for providing a form sustaining frame; a caster wheel pivotally attached to the lower side of said platform approximately medially and forwardly of said platform; oppositely disposed wheels rotatably mounted on the rear of said frame, all of said wheels being adapted to roll on a floor and support said frame upright with respect to said floor; an arm rest for each end of said seat secured to said frame, a detent strap disposed across and above said seat having its ends respectively secured to said arms for preventing a child, having its feet on said platform, from raising off of said seat; a steering handle attached to said frame disposed above, rearwardly and transversely with respect to the upper shelf; and a guard-rail disposed across and above the forward end of said upper shelf, said rail being secured to said frame for preventing a basket at times when the latter is disposed on said upper shelf, between said rail and said handle, from having sliding movements longitudinally of the device.

PAUL C. GALLAGHER.

REFERENCES CITED

The following references are of record in the file of this patent:

UNITED STATES PATENTS

| Number | Name | Date |
|---|---|---|
| D. 137,036 | Wade | Jan. 11, 1944 |
| 1,215,085 | Wannenwetsch | Feb. 6, 1917 |
| 1,353,180 | Preston et al. | Sept. 21, 1920 |
| 2,181,892 | Head | Dec. 5, 1939 |
| 2,362,186 | Brantz | Nov. 7, 1944 |
| 2,388,441 | Ressinger | Nov. 6, 1945 |

FOREIGN PATENTS

| Number | Country | Date |
|---|---|---|
| 207,617 | Great Britain | Dec. 3, 1922 |
| 466,399 | Great Britain | May 27, 1937 |